United States Patent [19]

Lock

[11] 4,309,456
[45] Jan. 5, 1982

[54] METHOD AND APPARATUS FOR COATING RECORDED DISCS WITH A LUBRICANT

[75] Inventor: Brian E. Lock, Oakland, N.J.

[73] Assignee: RCA Corporation, New York, N.Y.

[21] Appl. No.: 190,079

[22] Filed: Sep. 23, 1980

[51] Int. Cl.³ .............................................. B05D 1/02
[52] U.S. Cl. ................................... 427/209; 239/498; 239/455; 184/6.26; 427/421; 427/424; 118/300; 118/316; 118/326
[58] Field of Search ...................... 427/209, 421, 424; 239/498, 455; 184/6.26; 118/316, 326, 300

[56] References Cited

U.S. PATENT DOCUMENTS

| | | | |
|---|---|---|---|
| 768,095 | 8/1904 | Twist | 239/455 |
| 1,702,784 | 2/1929 | Koplin | 118/300 |
| 2,465,420 | 3/1949 | Barnett | 239/498 X |
| 2,538,562 | 1/1951 | Gustin et al. | 117/33.5 |
| 2,710,589 | 6/1955 | Brunner | 118/316 |
| 3,382,845 | 5/1968 | Jester | 118/326 |
| 3,387,607 | 6/1968 | Gauthier et al. | 128/173 |
| 3,840,391 | 10/1974 | Spitz et al. | |
| 3,844,820 | 10/1974 | Shaffer et al. | 427/209 |
| 3,916,077 | 10/1975 | Damrau | 427/248 |
| 4,073,966 | 2/1978 | Scholes et al. | 427/27 |

*Primary Examiner*—Shrive P. Beck
*Attorney, Agent, or Firm*—Birgit E. Morris; Donald S. Cohen

[57] ABSTRACT

The surfaces of a recorded disc are coated with a thin layer of lubricant by forming in an atomizer chamber droplets of the lubricant supported in air. The droplets are formed by passing a flow of air through a supply of the lubricant in the atomizer chamber at a rate and pressure such that the air causes the lubricant to be blown into the space above the supply as fine droplets. The air laden with the lubricant droplets flows out of the atomizer housing to a pair of nozzles in a coating chamber. The nozzles direct the air laden with the lubricant droplets onto the surface of the recorded disc which passes between the nozzles. Excess lubricant which does not coat the disc is collected in the coating chamber and carried back to the atomizer housing.

38 Claims, 7 Drawing Figures

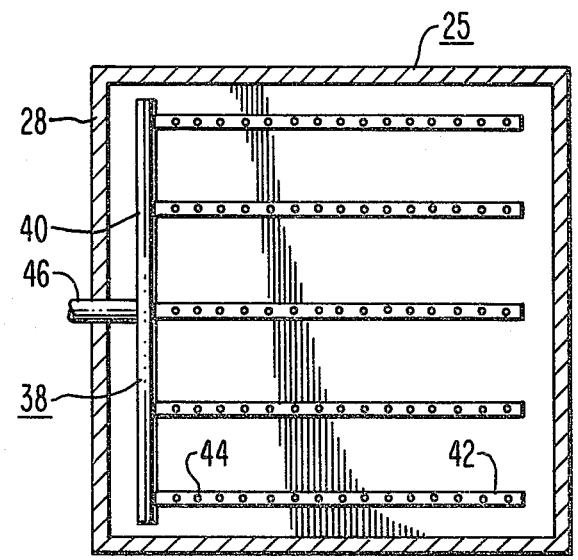
*Fig. 3*
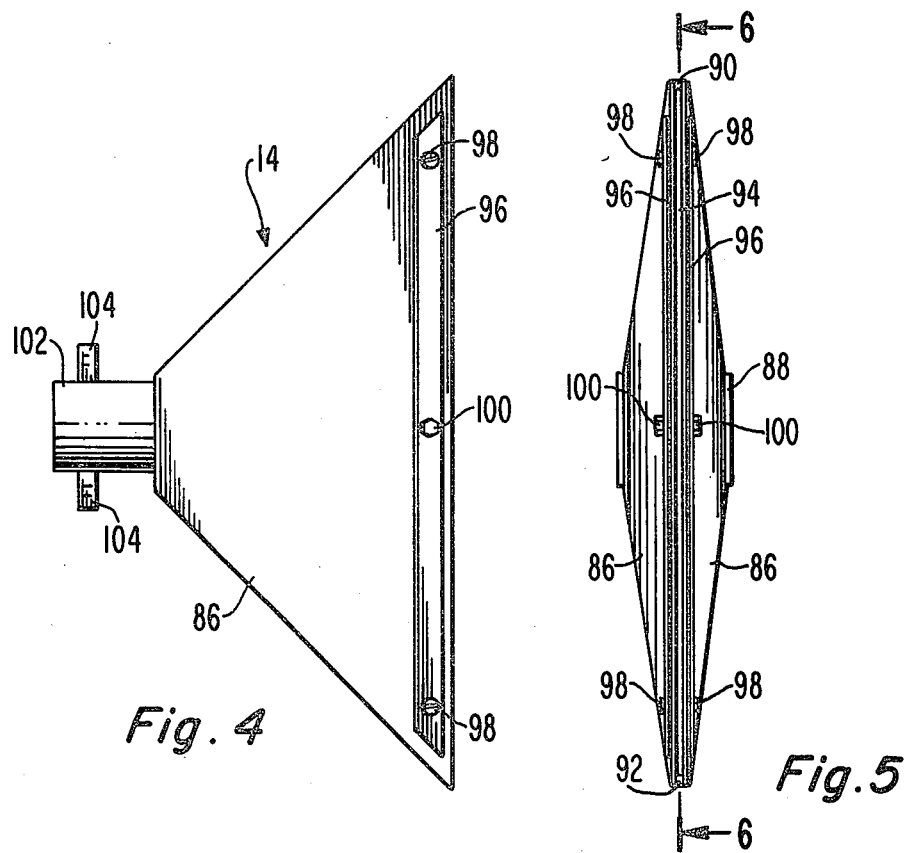
*Fig. 4*
*Fig. 5*

4,309,456

METHOD AND APPARATUS FOR COATING RECORDED DISCS WITH A LUBRICANT

BACKGROUND OF THE INVENTION

There has been developed recently a high density recorded disc, i.e. a video disc, in which the recorded information is in the form of a surface relief pattern formed along a spiral path in the major surfaces of the disc. Preferably, the surface relief pattern is formed in a spiral groove in the major surfaces of the disc. The disc includes a very large number of the grooves per radial inch, about 10,000 per inch, with the groove being very small, about 2.7 microns in width and on the order of 4000 Angstroms in depth. The record is played with a stylus which has a very fine tip which rides in the groove. One form of such a stylus is shown in U.S. Pat. No. 4,162,510 to E. O. Kaizer, issued July 24, 1979, entitled "KEEL-TIPPED STYLUS FOR VIDEO DISC SYSTEMS". During play of the record, the record is rotated at a relatively high speed, about 450 r.p.m. In order to reduce frictional forces and to prevent wear of the stylus and/or the record, it is desirable to provide a layer of lubricant on the surface of the record. The lubricant should be uniformly coated over the entire surface of the record but should be thin, preferably between 200 and 300 Angstroms in thickness, so that it does not interfere with the proper playback of the disc.

Because of the viscosity of the lubricant, it has been found difficult to achieve the desired thin, uniform coating of the lubricant on the disc. One technique which has been developed is to apply the lubricant with heptane as a carrier. The lubricant is mixed with heptane, about 0.3 part of lubricant to 100 parts of heptane. The mixture is then sprayed onto the surface of the disc by passing the disc under a series of oscillating nozzles which apply the mixture. After one side of the disc is coated, the disc is turned over to permit coating of the other side. Although this system satisfactorily applies a thin, uniform coating of lubricant on the surfaces of the disc, it has a number of disadvantages. The system requires the use of large quantities of heptane, which is expensive. Also, the heptane system must be handled with great care since heptane is toxic, flammable and explosive. In addition, the lubrication efficiency, i.e. the amount of the source lubricant which actually finally coats the disc, is very low. Therefore, it would be desirable to have a lubricant coating system which applies a thin, uniform film of lubricant onto the disc without the use of an expensive carrier material, particularly without heptane, and which has a high lubrication efficiency.

SUMMARY OF THE INVENTION

A system for coating the surfaces of a disc with a thin film of a lubricant includes a chamber having a region which contains a supply of the lubricant. Streams of air are passed through the lubricant in the region causing the lubricant to atomize and form droplets. The droplets of the lubricant are supported in the chamber by the flow of air coming from the lubricant. The air carrying the droplets of lubricant flows to a nozzle which directs the droplets of lubricant against the surface of a disc which is moved past the nozzle. The system can be provided with a pair of nozzles between which the disc passes to permit coating both surfaces of the disc with the lubricant simultaneously.

BRIEF DESCRIPTION OF THE DRAWING

FIG. 3 is a sectional view taken along line 3—3 of FIG. 2.

FIG. 4 is a side view of a nozzle utilized in the system of the present invention.

FIG. 5 is a front elevational view of the nozzle.

DETAILED DESCRIPTION OF THE PREFERRED EMBODIMENT

Figure 1:
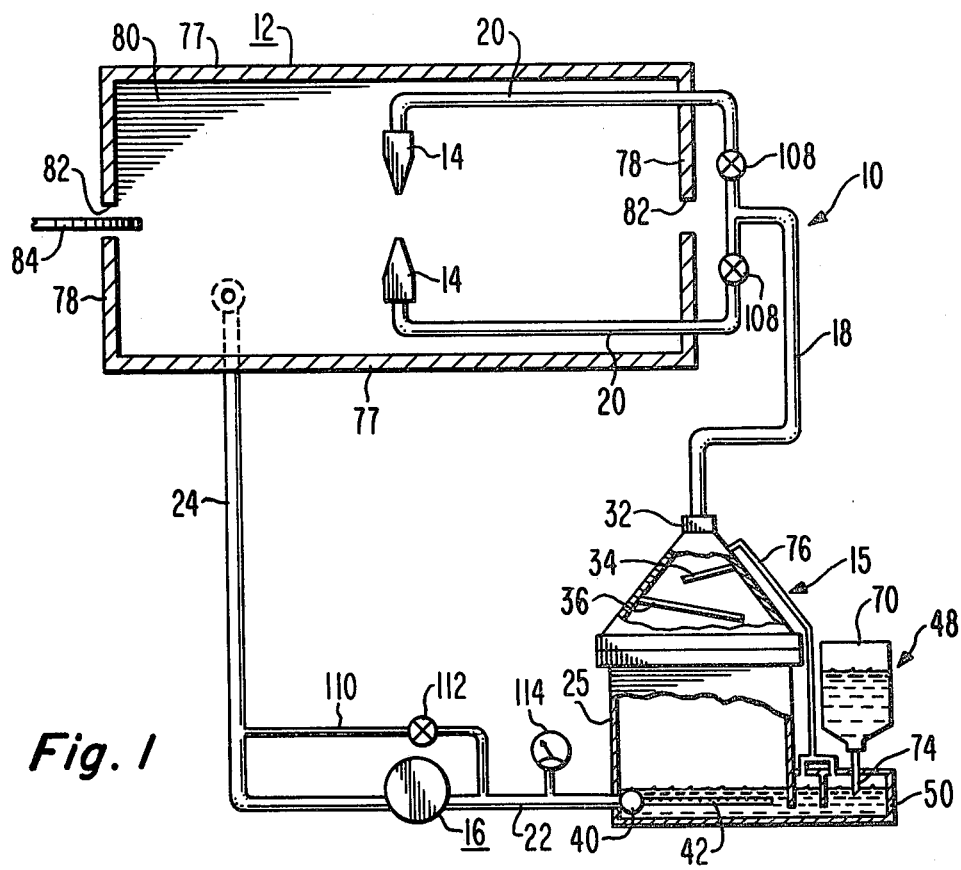
FIG. 1 is a schematic view of the system incorporating the present invention.

Referring initially to FIG. 1, the coating system of the present invention is generally designated as 10. Coating system 10 includes a coating chamber 12 having therein a pair of opposed coating nozzles 14, an atomizer 15 and a compressor 16. The atomizer 15 generates droplets of the lubricant which will flow through pipes 18 and 20 to the coating nozzles 14. The air compressor 16 provides a flow of air through pipe 22 to the atomizer 15, which air generates the lubricant droplets and carries them to the nozzles 14. The inlet end of the air compressor 16 is connected by a pipe 24 to the coating chamber 12 so as to pick up any excess lubricant and feed it back to the atomizer 15.

Figure 2:
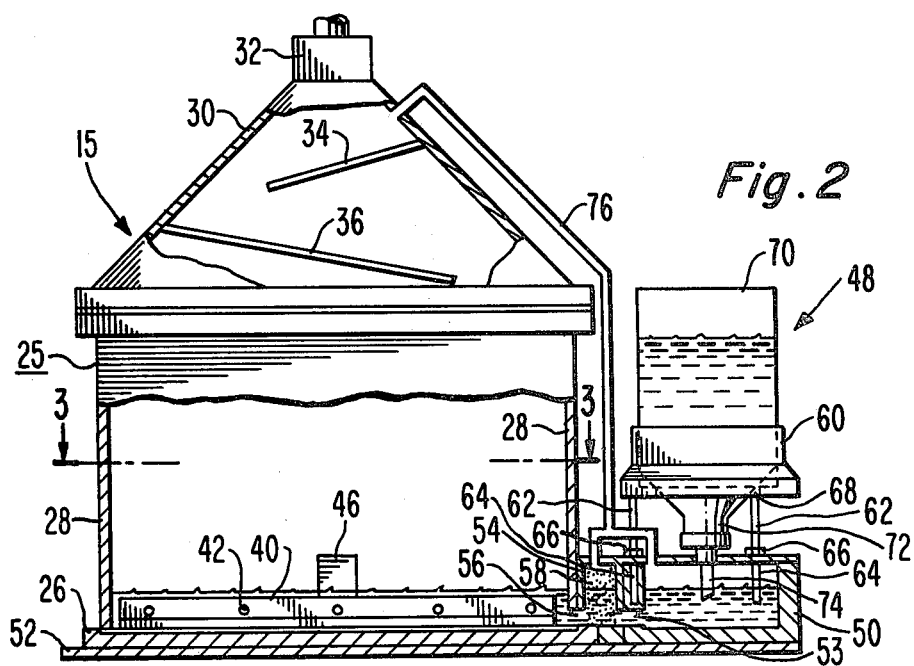
FIG. 2 is a side view of the atomizing chamber.
Figures 6, 7:
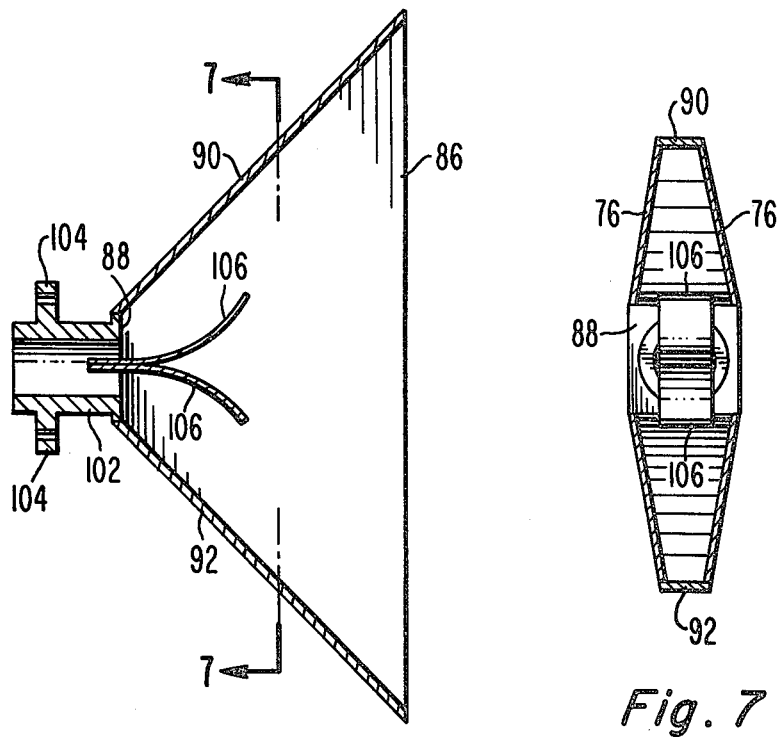
FIG. 6 is a sectional view taken along line 6—6 of FIG. 5.
FIG. 7 is a sectional view taken along line 7—7 of FIG. 6.

Referring to FIGS. 2 and 3, the atomizer 15 is a rectangular housing 25 having a base 26 and side walls 28. A cover 30 is mounted on the side walls 28 to form an enclosed chamber within the atomizer housing 25. The cover 30 has an outlet opening 32 at its top. A pair of baffle plates 34 and 36 extend partially across the cover 30 from opposite sides thereof to form a labyrinth passage between the bottom portion of the atomizer housing 25 and the outlet opening 32. On the base 26 is an aerator 38. As shown in FIG. 3, the aerator 38 includes a manifold pipe 40 extending along one wall 28 and a plurality of aerator pipes 42 extending from the manifold pipe across the atomizer housing. Each of the aerator pies 42 has a plurality of holes 44 therealong which face upwardly. The manifold pipe 40 has an inlet pipe 46 which extends through a wall 28 of the atomizer housing and is connected to the pipe 22 from the air compressor 16.

Adjacent the atomizer housing 25 is a lubricant supply 48. The lubricant supply 48 includes a level control container 50 mounted on the support plate 52 on which the atomizer housing 25 is mounted. The level control container 50 has an opening 53 through one wall thereof which opens into a chamber 54 between the level control container 50 and the atomizer housing 25. The adjacent wall 28 of the atomizer housing 25 has an opening 56 therethrough which also opens into the intermediate chamber 54. The opening 56 in the atomizer housing wall 28 is in alignment with the opening 53 in the level control container 50. The intermediate chamber 54 is filled with a wire mesh 58.

A cup-shaped reservoir support 60 is mounted above the level control container 50 by threaded supporting rods 62. The bottom ends of the support rods 62 extend into holes 64 in the outer wall of the level control container 50. Nuts 66 are threaded around the support rods 62 and are seated on the top of the level control container 50. By rotating the nut 66, the rods 62 can be moved up or down to adjust the position of the reservoir support 60 with respect to the level control container 50. The reservoir support 60 has an opening 68 in its bottom. A reservoir bottle 70 is seated in the reservoir support 60 and has a neck 72 extending through the opening 68 in the bottom of the reservoir support 60. An outlet tube 74 extends from the end of the neck 72 into the level control container 50. A tube 76 extends between the interior of the atomizer housing 25, preferably adjacent the outlet opening 32, and the interior of the level control container 50 so that the pressure in the top portion of the level control container 50 is the same as that in the atomizer housing 25.

The coating chamber 12 is an enclosed chamber having side walls 77, end walls 78, a bottom 80 and a top (not shown). The end walls 78 have aligned openings 82 therethrough through which a record 84 can pass into and out of the coating chamber 12 in a vertical upright position. The coating chamber 12 may be provided with any suitable means, such as an endless belt or chain mechanism, for carrying records 84 through the chamber 12 in a continuous manner. The pipe 24 between the coating chamber 12 and the air compressor 16 extends from the bottom 80 of the coating chamber 12.

Referring to FIGS. 4–7, each of the coating nozzles 14 includes a pair of frusto-conical side plates 86 extending from a square end plate 88. The narrow ends of the side plates 86 are secured to opposite side edges of the end plate 88. Secured between the top and bottom edges at the side plates 86 are conical top and bottom plates 90 and 92. The wide end edges of the top and bottom plates 90 and 92 are secured to the other opposed edges of the end plate 88. The narrow ends of the top and bottom plates 90 and 92 are at the free ends of the side plates 86 and space the free ends of the side plates 86 slightly apart to form a narrow discharge opening 94 between the side plates 86. The length of the discharge opening 94 is at least equal to the diameter of the disc to be coated. For a 12 inch disc, the width of the discharge opening 94 is preferably about 0.070 inch at its ends and 0.040 inch at its center.

An adjustment strip 96 extends along the outer surface of each side plate 86 adjacent the free front edge thereof. The ends of each adjustment strip are fixedly secured to its respective side plate 86, such as by screws 98. An adjustment bolt 100 is threaded through the adjustment strip 96 midway between its ends and engages the outer surface of the side plate 86. By threading the bolts 100 against the side plates 86, the side plates can be moved toward each other so as to adjust the width of the center portion of the discharge opening 94.

An inlet tube 102 extends through and is secured to the end plate 88. The inlet tube 102 has a pair of mounting flanges 104 projecting radially therefrom by which the nozzle 14 can be mounted in the coating chamber 12. A pair of deflection plates 106 are secured across the inlet tube 102 and extend into the space between the side plates 86. The deflection plates 106 curve away from each other toward the top and bottom plates 90 and 92, respectively. The width of the deflection plates 106 is less than the spacing between the side plates 86.

The coating nozzles 14 are mounted in the coating chamber 12 with the free ends of the nozzles being spaced apart a distance slightly greater than the thickness of the recorded disc to be coated. For example, for a disc of a thickness of 0.050 inch (1.27 mm), each of the nozzles should be spaced a distance of about 0.125 inch (3 mm) from the disc surface. Each of the pipes 20 is connected to the inlet tube 102 of a separate one of the nozzles 14. A restrictor valve 108 is in each of the pipes 20 to permit balancing the flow of the lubricant droplets from the pipe 18 to the nozzles 14.

A bypass pipe 110 is provided around the compressor 16 between the pipe 24 and the pipe 22. A restrictor valve 112 is provided in the pipe 110. A pressure gauge 114 is provided in the pipe 22 to indicate the pressure of the air at the inlet to the atomizer 15.

In the operation of the lubricating system 10, a reservoir bottle 70 containing the lubricant is placed in the reservoir support 60 with the neck 72 of the reservoir bottle 70 extending through the opening 68 in the bottom of the reservoir support 60 and the outlet tube 74 extending into the level control container 50. The lubricant will flow into the level control container 50 and into the bottom of the atomizer housing 15 through the opening 53, the intermediate chamber 54 and the opening 56. The level of the lubricant in the atomizer housing 25 is determined by the level of the lubricant in the level control chamber 50. The height of the reservoir bottle 70 over the level control chamber 50 determines the level of the lubricant in the level control chamber 50. Thus, by rotating the nuts 66, the level of the lubricant in the atomizer housing 25 can be adjusted to that desired. The level of the lubricant in the atomizer housing 25 should be such that the lubricant covers and is slightly higher than the aerator pipes 42. A level of the lubricant such that it is a distance of 0.100 inch (2.5 mm) above the aerator pipes 42 has been found to be satisfactory. The wire mesh 58 in the intermediate chamber 54 prevents air bubbles from flowing from the atomizer housing 25 to the level control chamber 50. Such bubbles could get into the reservoir bottle 70 so as to change the pressure therein and thereby adversely affect the level of the lubricant.

The air compressor 16 is turned on to cause a flow of air into the lubricant through the aerator pipes 42. The flow and pressure of the air is such that the air through the lubricant causes the lubricant to be blown into the air in the atomizer chamber 15. This forms fine droplets of the lubricant which vary in size from 0.5 to 100 microns. These fine droplets are carried by the air flowing from the lubricant upwardly through the atomizer housing 15 to the outlet opening 32. The air carrying the lubricant droplets must flow around the baffles 34 and 36 to reach the outlet opening 32. The baffles 34 and 36 cause the larger droplets of lubricant to drop back into the lubricant in the bottom of the atomizer housing 15.

The smaller droplets of lubricant are carried by the air through the pipe 18 and pipes 20 to the nozzles 14. As the lubricant carrying air passes into the nozzles 14, the deflection plates 106 distribute the lubricant across the entire length of the discharge opening 94. As a record disc passes between the nozzles 14, the lubricant is directed against the surfaces of the record 84 to apply a thin uniform coating of the lubricant on the surfaces of the record.

Excess lubricant which does not coat the disc drops to the bottom of the coating chamber 12 and is drawn into the pipe 24 to the air compressor 16 and then back to the atomizing housing 25. The bypass pipe 110 and restrictor valve 112 is used to control the pressure of the air passing from the air compressor 16 to the atomizer housing 25. This pressure is indicated by the pressure gauge 114.

The thickness of the coating applied to the disc is affected by the size of the lubricant droplets, the air speed, the velocity of the record passing the nozzles 14, the number and size of the holes in the aerator pipes 42 and the height of the lubricant in the atomizer 15. It has been found that lubricant droplets of a size of 2 to 15 microns will achieve the desired thickness of 250-300 Angstroms of lubricant layer on the record. Smaller droplets will not adhere to the disc because of insufficient mass and velocity. Although the lubricant droplets themselves are larger than the desired thickness of the film achieved on the disc, the droplets apparently spaced out enough after impinging on the disc to achieve the desired thin film. This size droplets was achieved in an atomizing housing which is about 12 inches square, using five aerator pipes 42, each having about 17 holes therein of a diameter of about 0.025 inch (0.6 mm). The air flow from the compressor 16 was about $5\frac{3}{4}$ cubic feet per minute (0.16 cubic meters/min) at a pressure of about $3\frac{1}{2}$ psig (0.25 kg/cm$^2$). Although the air reaching the nozzles may contain some lubricant droplets of a size greater than 15 microns, the major portion of the lubricant droplets are no greater than 15 microns in size. I have found that varying the air supply will vary the number of droplets produced with an increase in the air supply increasing the droplets produced and a decrease in the air supply decreasing the droplets produced. Increasing the level of the lubricant in the atomizer chamber will reduce the number of droplets produced but will also reduce the size of the droplets. Decreasing the level of the lubricant will produce larger numbers of the droplets but the droplet size will increase rapidly when approaching a height of 0.05 inch (1.27 mm) over the aerator pipes.

What is claimed is:

1. A method of coating a surface of a disc with a film of lubricant comprising the steps of:
    providing in a chamber a supply of lubricant of a volume less than the volume of the chamber so that the surface of the lubricant supply is unrestrained,
    passing streams of air through the lubricant to form a point slightly below the surface of the lubricant supply so as to create droplets of the lubricant supported in the air above the supply,
    feeding additional lubricant to the chamber so as to maintain the level of the lubricant supply in the chamber at a substantially constant amount above the point that the air streams are formed,
    carrying the air laden with the lubricant droplets to a nozzle, and
    directing the air laden with the lubricant droplets against the surface of a disc so that the droplets impinge on and coat the surface of the disc.

2. A method in accordance with claim 1 in which the flow of the air through the lubricant supply and the depth of the lubricant supply through which the air passes is such as to create lubricant droplets of a size between 0.5 and 100 microns.

3. A method in accordance with claim 2 in which the air flow is at a velocity of about $5\frac{3}{4}$ cubic feet per minute and a pressure of about $3\frac{1}{2}$ psig and the depth of the lubricant through which the air passes is about 0.100 inch.

4. A method in accordance with claim 3 in which the air is passed through the lubricant by placing in the lubricant a pipe having a plurality of small holes therein and flowing the air through the pipes and out of the holes.

5. A method in accordance with claim 2 in which the air laden with the lubricant droplets is directed around a labyrinth passage formed by baffles so that the larger droplets contact the baffles and fall back in the supply.

6. A method in accordance with claim 5 in which the size of a majority of the lubricant droplets directed against the surface of the disc is no greater than about 15 microns.

7. A method in accordance with claim 1 including directing the air laden with the lubricant droplets against both surfaces of the disc so as to simultaneously coat both surfaces with the lubricant.

8. Apparatus for coating the surface of a disc with a thin film of a lubricant comprising:
    a chamber having a region adapted to contain a supply of lubricant which is smaller in volume than the volume of the chamber so that the surface of the supply of lubricant is unrestrained,
    at least one aerator pipe extending through said region of the chamber slightly below the level of the supply lubricant, said pipe having a plurality of spaced holes therethrough,
    means for feeding air to said aerator pipe so as to provide streams of air through the lubricant above the aerator pipe to atomize the lubricant and form droplets of lubricant in said chamber,
    means for supplying lubricant to said region of the chamber and for maintaining the level of the lubricant above the aerator pipe,
    a nozzle for directing a stream of the lubricant droplets onto the surface of a disc, and
    means for carrying a flow of the lubricant droplets from said chamber to said nozzle.

9. Apparatus in accordance with claim 8 in which the aerator pipe comprises a plurality of spaced, substantially parallel aerator pipes each having a plurality of holes therethrough.

10. Apparatus in accordance with claim 9 in which the means for feeding air to the aerator pipes includes a manifold pipe having an inlet pipe connected thereto and the aerator pipes extend from the manifold pipe.

11. Apparatus in accordance with claim 10 in which the chamber is in a housing having side walls, a bottom and a cover, the cover having an air outlet opening through which the lubricant droplets can flow out of the housing, and the manifold pipe and aerator pipes are at the bottom of the housing.

12. Apparatus in accordance with claim 11 including a plurality of baffle plates extending in opposite directions across the housing to form a labyrinth passage for the flow of the lubricant droplets to the outlet opening.

13. Apparatus in accordance with claim 11 including reservoir means for supplying lubricant to the bottom region of the housing.

14. Apparatus in accordance with claim 13 including an air compressor connected to the inlet pipe of the manifold for supplying air to the aerator pipe.

15. Apparatus in accordance with claim 13 in which the lubricant level control means includes a container mounted adjacent the housing and an opening between the container and the housing whereby lubricant can flow from the container into the bottom of the housing, and the reservoir means includes a bottle having an outlet tube extending therefrom, said bottle being mounted above the container with the end of the outlet tube extending into the container.

16. Apparatus in accordance with claim 15 in which there is an intermediate chamber between the level control container and the housing through which the opening between the level control chamber and the housing passes and a wire mesh is in the intermediate chamber and extends across the opening.

17. Apparatus in accordance with claim 15 in which a cup-shaped reservoir support having an opening through the bottom thereof is supported above the level control container and the reservoir bottle is seated in the support and extends through the opening in the support.

18. Apparatus in accordance with claim 17 in which the reservoir support is mounted on the level control chamber by means which permits adjustment of the height of the support above the container.

19. Apparatus in accordance with claim 8 in which the means for feeding air to the aerator pipe includes an air compressor.

20. Apparatus in accordance with claim 19 in which the nozzle is in a coating chamber and the inlet of the air compressor is connected to the coating chamber to withdraw excess lubricant from the coating chamber.

21. Apparatus in accordance with claim 20 in which the coating chamber has at least one opening therethrough through which a disc can pass to be presented to the nozzle.

22. Apparatus in accordance with claim 21 in which there are two nozzles in the coating chamber having discharge openings which are in spaced opposed relation, the disc is adapted to pass between the nozzles and means is provided for carrying the flow of the lubricant droplets to both nozzles simultaneously to permit coating both sides of the disc simultaneously.

23. Apparatus in accordance with claim 22 in which the coating chamber has a pair of openings therethrough to permit the disc to enter and leave the chamber.

24. Apparatus in accordance with claim 8 in which the nozzle includes a pair of frusto-conical side plates connected together by top and bottom plates so that the longer ends of the side plates are in closely spaced relation to form a narrow discharge opening and an inlet opening into the nozzle at the short end of the side plates.

25. Apparatus in accordance with claim 24 in which the shorter ends of the side plates are spaced apart a distance greater than the spacing between the longer ends.

26. Apparatus in accordance with claim 25 in which the inlet opening includes an inlet tube extending into the nozzle and a pair of deflector plates are mounted across the inlet tube and extend into the space between the side plates, said deflector plates curving away from each other toward the top and bottom plates.

27. Apparatus in accordance with claim 26 including means for adjusting the spacing between the side plates at the longer ends so as to adjust the width of the discharge opening.

28. Apparatus in accordance with claim 27 in which the spacing adjusting means includes an adjustment strip extending along the outer surface of each of the side plates adjacent the longer ends, said adjustment strips being secured in their ends to their respective side plates, and a bolt threaded through each of the adjustment strips between its ends and engaging their respective side wall for adjusting the spacing between the side walls.

29. An atomizer for forming droplets of a lubricant comprising:
   a chamber having a region adapted to contain a supply of lubricant which is smaller in volume than the volume of the chamber so that the surface of the supply of lubricant is unrestrained,
   at least one aerator pipe extending through said region of the chamber slightly below the level of the supply lubricant, said pipe having a plurality of spaced holes therethrough,
   means for feeding air to said aerator pipe so as to provide streams of air through the lubricant above the aerator pipe to atomize the lubricant and form droplets of lubricant in said chamber, and
   means for supplying lubricant to said region of the chamber and for maintaining the level of the lubricant above the aerator pipe.

30. An atomizer in accordance with claim 29 in which the aerator pipe comprises a plurality of spaced, substantially parallel aerator pipes each having a plurality of holes therethrough.

31. An atomizer in accordance with claim 30 in which the means for feeding air to the aerator pipes includes a manifold pipe having an inlet pipe connected thereto and the aerator pipes extend from the manifold pipe.

32. An atomizer in accordance with claim 31 in which the chamber is in a housing having side walls, a bottom and a cover, the cover having the outlet opening therethrough, and the manifold pipe and aerator pipes are at the bottom of the housing.

33. An atomizer in accordance with claim 32 including a plurality of baffle plates extending in opposite directions across the housing to form a labyrinth passage for the flow of the lubricant droplets to the outlet opening.

34. An atomizer in accordance with claim 32 including reservoir means for supplying lubricant to the bottom region of the housing.

35. An atomizer in accordance with claim 34 in which the lubricant level control means includes a first container mounted adjacent the housing and an opening between the first container and the housing whereby lubricant can flow from the first container into the bottom of the housing, and the reservoir means includes a second container having an outlet tube extending therefrom, said second container being mounted above the first container with the end of the outlet tube extending into the first container.

36. An atomizer in accordance with claim 35 in which there is an intermediate chamber between the level control container and the housing through which the opening between the level control chamber and the housing passes and a wire mesh is in the intermediate chamber and extends across the opening.

37. An atomizer in accordance with claim 35 in which a cup-shaped reservoir support having an opening through the bottom thereof is supported above the level control container and the second container is seated in the support and extends through the opening in the support.

38. An atomizer in accordance with claim 37, in which the reservoir support is mounted on the level control chamber by means which permits adjustment of the height of the support above the first container.

* * * * *